I. N. Forrester,
Reciprocating Saw Mill.
No. 393. Reissued Sep. 2, 1856.
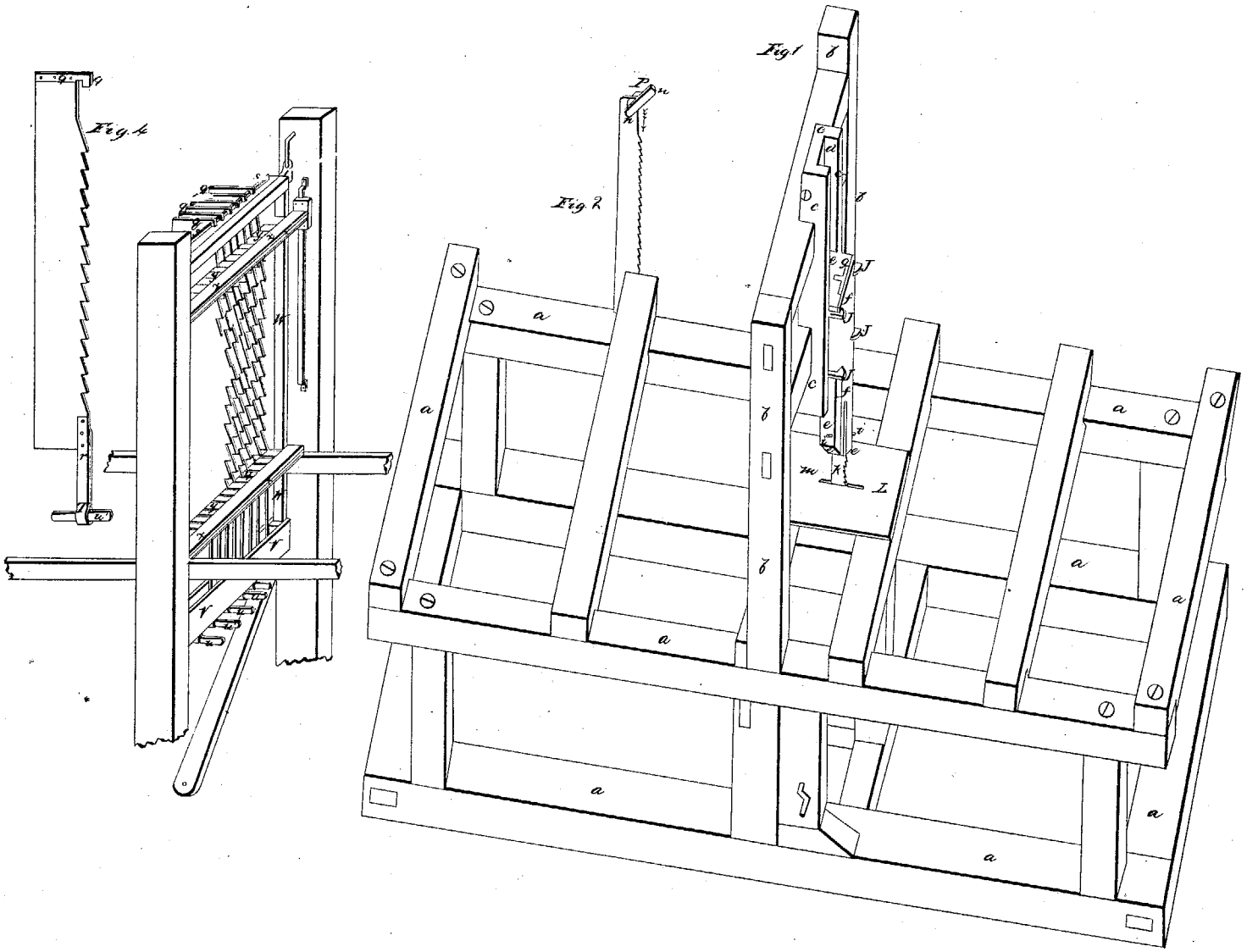
AM. PHOTO-LITHO. CO. N.Y. (OSBORNE'S PROCESS)

UNITED STATES PATENT OFFICE.

ISAAC N. FORRESTER, OF CENTREVILLE, VIRGINIA.

IMPROVED METHOD OF HANGING AND STRAINING RECIPROCATING SAWS.

Specification forming part of Letters Patent No. 13,716, dated October 30, 1855; Reissue No. 393, dated September 2, 1856.

*To all whom it may concern:*

Be it known that I, ISAAC N. FORRESTER, of Centreville, in the county of Fairfax and State of Virginia, have invented and made certain new and useful Improvements in the Manner or Mode of Hanging and Arranging Muley and all other Reciprocating Saws for Saw-mills, and which improvements I term the "Self-Ranging Saws;" and I do hereby declare that the following is a clear, full, and exact description of the same, reference being had to the accompanying drawings, making a part of this specification, in which—

Figure 1 is a perspective view or sketch of the framing or superstructure of a saw-mill, as at *a a a a a a a a a a* and *b b b b b; c c c c*, the way; *d*, the adjusting slide-groove; *e e e e*, the guide-block, with saw or play groove *g g*. *f f* is the cap to groove. *h* is a slot for oiling slides of saw. *i i* are tightening-pins. J J J J are clamps or key-staples. K is the saw; L, the saw-table. *m m* is the kerf or guide-slot.

Fig. 2 shows the saw-blade detached, with the ears or flanges *n n* attached to the saw by side pieces or clamps, *p p*. This saw-blade shows the application of the ranging devices when designed for a single or slabbing saw, as in Fig. 1.

Fig. 3 shows a gang or series of saw-blades arranged to the framing and ways, and the cross-heads.

Fig. 4 shows one of the gang-saws detached.

Deeming it unnecessary to describe in full the general construction of saw-mills, as I do not comprehend herein any claim thereto, I will therefore confine myself to the description of the principle of my improvements and the object attained thereby.

It is a well-known fact that in the very numerous improvements in saw-mills, as well as in the various alleged improved modes of hanging saws, the aim has been to so arrange the hanging of the saw or straining of the blade that in the cutting of the log or timber the saw-blade should not leave the log or cut with irregularity, or deflect from the direct or parallel position relative to the log, or to incline or tend toward the sides of the carriage, whereby the kerf or track of the saw would not be out of a true line. These defects and difficulties in hanging saws have been more or less consequent upon the application of the various modes resorted to heretofore, and consequently the operation of sawing has been attended with much defective timber and considerable loss of lumber.

In applying my mode of hanging saws to gang-mills various important results ensue, as will hereinafter be set forth, and my experience and close observation in the construction and erection of saw-mills have enabled me to proceed with numerous experiments, the results thereof being attended with complete success in discovering the required method of hanging saws so as to accomplish the desired purpose.

I have tested and proved the fact that the undue strain or rigidity of the saw-blades throughout their extent of surface has been the sole cause of the very great difficulties mentioned. In all other modes of hanging saws than mine the ends of the saws have been buckled or strained so stiff and rigid by the application of clamps or lateral pieces that the back edges of the blades possess as much rigidity as does the teeth part, the tendency of which is to make the blades of the saws wind, or become more or less twisted if becoming heated, through the rapid action and abrasion or rubbing of the surfaces of the blades against the timber. Thus it not unfrequently occurs that in commencing on the side of a log with a single saw the blade has a tendency to deflect outward, owing to the action of the plank part of the log "flopping" or striking against the saw-surface, owing to the vibratory action of the detached part of log, which plays more or less, and more on one side of the blade. Especially does this action ensue when blades, as ordinarily hung, encounter knotty or tough portions of the timber, thus heating, expanding, and twisting the blades, and springing or winding out of true, and not unfrequently stretching or elongating as to be rendered almost useless for sawing purposes. When such causes operate, the cut or kerf of the saw is irregular and rough, owing to the binding of portions of the blades, and under no circumstance whatever, when such causes exist, can even, smooth, and good lumber be produced, but instead the surface of the lumber will indicate every rake or cut of the blade. The action of my saws appears to be somewhat similar to the action of the pressure of water on a vessel's rudder, or as the curved lateral motion of a fish's tail gives direction to the fish's body or its head. Wherever there is a bend, spring, or twist of the blade part, and no matter how small, such irregular surface tends to control or act upon the course or direction of the teeth. These difficulties, however, cannot occur in my mode of hanging saws, as I do not strain the ends thereof nor stiffen the surface of the blade; but the nature and principle of my improvements consist in arranging a single muley slabbing saw-blade in the following manner, viz: I take an ordinary mill-saw blade and attach to one end thereof, on the front or teeth part or cutting-edge, flanges or ear guide-pieces *n n*, Fig. 2, riveted to the saw-blade, as at *p p*, when a slabbing or single blade is used, or by employing clamp flange-plates $g^2$ $g^3$, as at Fig. 4. The ears *n n*, Fig. 2, of a muley slabbing-blade are attached so as to allow the point or line of connection to be in a vertical line with the base of the teeth, as indicated by the arrow. The lower end of the saw-blade may be hung in the same way, or merely a hole punched in a line with the base of the teeth, by which hole the blade is hooked onto a hook or rod and connected to a pitman-rod. When gang-blades are employed, then they must be attached to the devices shown in Fig. 4, said devices being formed with hook-like flange plates or strips of metal, as at *g g*, which hooks work over a ridge or flange strip attached to the front side of the upper cross-head, as at *s s*, Fig. 3, wherein a small gang of saws are shown arranged in their gate and framing. It will be observed, too, that the blades thus arranged at their upper ends are perfectly free and unstrained. The lower extremities of the blades are attached to clamp-strips *r r*, formed either solidly with eyes or key-places T, in which fit the keys or tightening-wedges *u u*, Figs. 3, 4; or a simple strip of strap-iron may be employed, folded together and riveted onto the blade, and forming by the folding thereof the required eye or key-place, thus forming the shank part of the blades. These shanks (when gangs are employed) pass downwardly through a lower cross-head formed of two horizontal metal plates, or of a cast-metal head in one piece, as indicated at *v v*, Fig. 3, and working on ways *w w*. The shanks are then keyed, as at *u u u u*, Fig. 3.

In addition to the upper and lower cross-heads I employ devices which I term "detachable" comb-like gage blocks or guides, made of wood or metal and inserted between cast-iron or wooden plates or clamps, as at *x y x y*, Fig. 3. These gage-blocks can be of various degrees or intervals, according to the thickness of plank or lumber required. These gage-blocks and plates or clamps are adjustable up and down, and are employed to receive the teeth part or cutting-edge of the saw-blades, and to keep the blades in a vertical line. Thus arranged the back edges of the saw-blades and all the surface from the teeth backward to the back edge are free, unstrained, and divested of all stiffness and rigidity.

By my method of hanging saws each saw-blade is separate and independent in itself, and one imperfect blade cannot affect the others, for when a blade by heating expands or elongates or the teeth break, such defective blade can be detached by simply loosening and taking out the keys and detaching the blade without having to take apart all the gate and other saws. In detaching a blade and substituting another not more than three minute's time is required. Again, too, when a blade elongates, all that is necessary is simply to tighten the key, when the defect is at once remedied, thus avoiding entirely the great trouble of adjusting saw-blades by the old modes.

It must be readily perceived that, owing to the freedom and flexible property of saw-blades as hung by my mode, rigidity or stiffness of operation is not communicated to the teeth, and consequently, as the line of tension is only downward through the base of the saw-teeth, any irregularity or inequality of movement or vibratory action of the parts of lumber being detached from the log cannot affect the direction or course of the teeth in the least, but, on the contrary, the teeth control the direction of the blade and act as their own guides.

The advantages also attained by me in my mode of arranging and hanging saws are that, as I do not require such a great draft or strain on the blades, I can employ very light, less cumbrous cross-heads, which may be made of cast metal, light and perfectly durable, and well adapted in every particular to holding the saws. It will be perceived that the draft on the saw is not throughout its whole width, as in ordinary mill-saws, but merely down through the teeth and the width of the shank attachment *r r*. Then, again, as the draft or strain of blade is almost entirely done away with, wider cross-heads, admitting of a greater number of blades, can be employed without requiring any very greatly increased strength of cross-heads. A gang of thirty-six of my saws can be readily arranged for use or hung in less than an hour.

Another marked feature of improvement in my self-ranging saws is the fact that four (or more) logs can be reduced to lumber at one and the same time by arranging two logs abreast and placing two more thereon, and with a greatly reduced increase of power in proportion.

The cost of erecting a gang of saws arranged on my plan is, by actual estimate, about one-half, or nearly fifty per cent., less than in the ordinary manner, and the wear and waste in the same proportion.

A gang of thirty-six of my saws with thirty-horse power runs two hundred strokes per minute with a quarter-inch feed and cut. By a recent experiment seventy-six boards eighteen feet long, twelve inches wide, five-eighths thick, were sawed in ten minutes; thus showing the enormous amount of thirteen hundred and sixty-eight feet, running measure, in ten minutes, eight thousand two hundred and eight running feet per hour, or an average of about eighty thousand feet, running measure, per diem of ten hours.

To attend a gang of thirty-six saws on my plan will require four hands, including running engine, feeding and supplying the saws, filing and arranging them.

To attend a gang of saws arranged in the ordinary manner will require from eight to twelve hands. Thus it may be seen that my improvements are of the most important haracter in their several features of simplicity of construction, cheapness, durability, and expeditious operation.

Having described my improved mode of hanging and arranging saw-blades, and clearly shown the marked features of improvement, distinguishing said mode from all others, what I claim as new and of my own invention, and desire to secure by Letters Patent of the United States, is—

1. The manner or mode of hanging reciprocating saw-blades by forming thereon, or by attaching to the ends and front edge thereof, ears or guide-flanges *n n*, Fig. 2, hook-clamps *g g*, and shank devices *r r* T, Fig. 4, so that the tension or strain and the draft of the blades will be in a direct line longitudinally through the base of the teeth and front edge of the blade, whereby the whole of the surface or the plate part of the saw-blade is left free, unstrained, and divested of all rigidity and stiffness, in the manner substantially as described.

2. The adjustable guide-plates with the slotted or grooved gage-pieces *g g*, Fig. 1, and *x y x y*, Fig. 3, substantially as set forth.

ISAAC N. FORRESTER. [L. S.]

Witnesses:
JOHN S. GALLAHER, Jr.,
RO. H. GALLAHER.